United States Patent [19]

Stumpf

[11] Patent Number: 4,986,518

[45] Date of Patent: Jan. 22, 1991

[54] POCKETED COIL STRINGS HAVING A FLAT OVERLAP SIDE SEAM

[75] Inventor: Walter Stumpf, Dunwoody, Ga.

[73] Assignee: Simmons U.S.A. Corporation, Atlanta, Ga.

[21] Appl. No.: 354,482

[22] Filed: May 19, 1989

Related U.S. Application Data

[62] Division of Ser. No. 205,920, Jun. 13, 1988, Pat. No. 4,854,023.

[51] Int. Cl.[5] ......................... F16F 3/04; A47C 27/04

[52] U.S. Cl. ......................................... 267/91; 5/477; 267/89

[58] Field of Search ....................... 267/94, 89, 97, 91, 267/80, 81, 93; 5/477

[56] References Cited

U.S. PATENT DOCUMENTS 1,466,617 8/1923 Foster .
2,048,979 7/1936 Trotta et al. .......................... 5/477
2,359,003 9/1944 Sawyer .................................. 5/477
2,430,098 11/1947 Binch .................................... 5/477
3,462,779 8/1969 Thompson .
3,668,816 6/1972 Thompson .
4,234,983 11/1980 Stumpf .
4,439,977 4/1984 Stumpf .
4,451,946 6/1984 Stumpf .
4,485,506 12/1984 Stumpf et al. .
4,578,834 4/1986 Stumpf .

*Primary Examiner*—Robert J. Oberleitner
*Attorney, Agent, or Firm*—Jones, Askew & Lunsford

[57] ABSTRACT

An encapuslated spring for use with mattresses, cushions, or the like, including a spring enclosed within flexible sheet material, the material being formed in a tubular configuration such that its longitudinal edges are in a flat overlap configuration. The flat overlap configuration reduces a phenomenon known as false loft.

12 Claims, 7 Drawing Sheets

POCKETED COIL STRINGS HAVING A FLAT OVERLAP SIDE SEAM

This is a division, of application Ser. No. 07/205,920, filed June 13, 1988, now U.S. Pat. No. 4,854,023.

TECHNICAL FIELD

The present invention generally relates to spring assemblies for mattresses, cushions, and the like, and more particularly to connected series of individually-pocketed springs for mattresses and cushions.

BACKGROUND OF THE INVENTION

In mattress and cushion construction, a need has been recognized for mattresses or cushions which provide comfortable and durable supporting surfaces, but are also cost-effective to produce.

A variety of configurations have been used to provide such optimum sleeping surfaces. Some mattress configurations have included types of foam rubber to provide a cushioning effect to support the human body. Other configurations have utilized a plurality of spaced-apart coil springs, which, depending on the user, provide support preferred to that provided by foam rubber only.

Spring Assemblies

One example of such a spaced-apart coil spring assembly is U.S. Pat. No. 4,051,567 to Hutchinson, which discloses a coil spring assembly including aligned rows of coil springs connected together within each row and between rows, and also includes additional reinforcing springs which are interspersed about the periphery of the spring assembly, with all springs being held in place by a border helical and helical tie wires. Although such mattress configurations are effective, disadvantages are apparent in that such linked configurations do not allow for independent action of the springs, thus preventing the mattress from conforming accurately to the user's body.

Pocketed Coil Springs

It has also been known to provide springs in a preloaded state, prior to assembly of the springs into a mattress or cushion construction. The preloaded configuration of the springs provides a supporting structure that is sufficiently yielding to be comfortable but does not deflect excessively as would a cushion or other structure composed of similarly configured but non-preloaded springs.

One example of such constructions is in U.S. Pat. No. 1,466,617 to Foster, entitled "COVERED SPRING STRUCTURE", discloses a tubular covering formed on flexible material such as cotton cloth or the like, provided by bringing opposite edges of a long strip of cloth together and sewing through both layers of cloth near the adjacent edges by a row of stitches. The length of the tubular material is then cut into individual units of a desired length by cutting the long tube along dotted lines 16, illustrated in FIG. 1. Springs are then provided into the individual tubular coverings such that they can then expand into a semi-compressed state. The covered springs are then assembled side-by-side and then fastened by fastening means such as U-shaped metal clips. The feature of having the springs held under partial compression provides a structure that is sufficiently yielding to be comfortable but without the great extent of sag or give before the person is sustained that is present in a cushion or other structure composed of equally soft or resilient springs. It may be seen that the covered spring structures shown in Foster include narrow strips 17 of material beyond the stitches 15, which may extend in a radial direction relative to the longitudinal axes of the springs, or may extend in a generally axial direction (column 2, line 103-column 1, line 3). It should be noted that Foster provides that "[a]s far as convenient in assembling, this seam will be placed at the top or bottom of the tube when the tube and the spring are assembled (col. 2, lines 4–7). Another feature of the individual tubular coverings is that the covering they provide may prevent wear or noise from the springs (p 2, lines 122–124).

Pocketed Coil Strings

In order to provide improved handling characteristics, it has been known to provide "strings" of pocketed coil springs, wherein the springs are encapsulated in a preloaded state within pockets formed in an elongate strip of fabric, the axes of the springs being generally parallel to each other. For purposes of this application such configurations will be referred to as "pocketed coil strings". It should also be understood that the terms "coil", "spring", and coil spring are interchangeable for purposes of this discussion.

As discussed in greater detail later in this application, such pocketed coil strings may be aligned with and attached to other coil strings by various attachment means, in order to provide mattress or cushion assemblies.

Radially Extending Seams

U.S. Pat. No. 3,462,779 to Thompson, entitled "CUSHION" includes strings of coils disposed intermediate resilient deformable layers of material which may be foam rubber. Each coil string is formed as shown in Thompson's FIG. 3, wherein individual springs are first positioned in a side-by-side relationship, durable spring covering material is then placed above and below the springs, and finally seams are sewn about the periphery of the row of springs, and also intermediate each spring, thus encapsulating each spring. It should be noted that such a configuration includes a outwardly-disposed seam 38, which extends the length of each of the coil strings in a generally radial method relative to the longitudinal axes of the springs. As it may be understood that such an outwardly-disposed seam extends radially relative to the longitudinal axis of the springs, such seams will now be referred to as "radially" extending seams. The disadvantages of these seams are evident in that it may be seen that the seams may interfere with the seams of adjacently-situated strings. Further disadvantages exist in that excessive pocket materials are required to fabricate the pocketed coil strings, especially for taller spring configurations.

Axially Extending Seams

In my U.S. Pat. No. 4,234,983, entitled "THERMALLY WELDED SPRING POCKETS", pocketed coil strings are provided, in which the individual springs are formed between the overlaid plies of a two-ply strip of material by lines of separate individual thermal welds which connect the plies together. It should be noted that such configurations include a seam which extends along one end of the springs. For purposes of this application, such a configuration will be referred to as having an "axially"-extending seam, as the seam (or seams) extends in an axial manner along the longitudinal axes of the springs.

Pocketed Coil String Manufacture

In my U.S. Pat. No. 4,439,977, entitled "METHOD AND APPARATUS FOR MAKING A SERIES OF POCKETED COIL SPRINGS", a method and apparatus are disclosed for making coil springs pocketed within individual pockets in an elongate fabric strip comprised of two overlaying plies capable of being thermally welded together. The fabric strip is fed along a guide path during which compressed springs are inserted between the plies with the axes of the springs substantially normal to the planes of the plies, whereafter the fabric plies are thermally welded together longitudinally and transversely to form a string of pocketed coils. After thermal welding, the pocketed coils are passed through a turner assembly during which the springs are reoriented within the fabric pockets to positions wherein the axes of the springs are transverse to the fabric strip. Although this method of manufacture has several advantages, one disadvantage is that, during the turning process, the springs may tend to become "hooked" on themselves, and do not extend to their proper positions. Therefore, additional and costly labor is required to orient the "hooked" springs to their desired configurations. Even if the springs do not become "hooked", difficulties may still arise in correctly aligning them to their desired positions, with the longitudinal axes of the springs being substantially parallel.

Assemblies of Strings of Pocketed Coils

As previously discussed, pocketed coil strings may be readily assembled into mattress or cushion assemblies. An example of the use of such strings is shown in my U.S. Pat. Nos. 4,234,984, entitled "POCKETED SPRING ASSEMBLY" and 4,401,501, entitled "APPARATUS FOR MAKING ASSEMBLIES OF POCKETED SPRINGS" in which strips of pocketed upholstery springs are assembled, one strip at a time, into mattresses and the like. The connections of each such strip to its predecessor are made between the interpocket webs of the pocket sheeting of the two adjacent strips, preferably at intervals of two springs, and are staggered by one spring from strip to strip. The disclosed and preferred technique for joining the pocket material of the adjacent strips is thermal welding by ultrasonic vibration, but other specific forms of connection are also suggested.

In my U.S. Pat. No. 4,451,946, entitled "POCKETED SPRING ASSEMBLY", an improvement of my U.S. Pat. No. 4,234,984 is discussed. The improvement includes an elongated connection which connects the pocket sheeting of adjacent strips together between adjacent springs of a strip, with the firmness of the assembly thus being increased by the nature of the elongated interstrip connection.

In my U.S. Pat. No. 4,523,344, entitled "INDEPENDENT BLOCK ASSEMBLY OF SPRINGS", a spring assembly is disclosed which includes a plurality of interconnected longitudinal blocks of pocketed coil springs. each block includes a pair of interconnected strips of pocketed springs which are preferably arranged in a square array. Each pair of strips is tightly encased by a flexible cover. The covers are connected to each other along longitudinal hinge lines which allows the assembly to bend easily in at least one direction.

In my U.S. Pat. No. 4,578,834, entitled "INNERSPRING CONSTRUCTION", an innerspring construction including adhered strings of pocketed coil springs is disclosed together with a method of manufacture. The strings are connected to each other by an adhesive applied between the lines of tangency of adjacent coil springs. A hot melt adhesive applicator traverses a string of pocketed coils, depositing a precise amount of adhesive on each coil jacket. A second string is positioned on the first, and pressure is applied thereto. The applicator then traverses the second string in the same manner as the first. The sequence is repeated until an innerspring construction of desired size is created. My U.S. Pat. No. 4,566,926, entitled "METHOD AND APPARATUS FOR MANUFACTURING INNERSPRING CONSTRUCTIONS", a continuation in part of U.S. Pat. No. 4,578,834, discloses the method and apparatus for manufacturing the mattress assembly disclosed in U.S. Pat. No. 4,578,834.

Miscellaneous Approaches

In U.S. Pat. No. 3,668,816, entitled "METHOD AND APPARATUS FOR CONSTRUCTING FABRIC ENCLOSED SPRINGS", strips of web material are longitudinally folded for receiving compressed coil springs therebetween. The fabric is first folded along a longitudinal fold line 37, forming a two-ply configuration with one ply 36 being somewhat wider than the second play 34. Axially compressed springs are then inserted between the plies in spaced-apart relation. Transverse sew lines are then provided to the fabric with the springs still compressed, thus sewing the plies 34, 36, together and forming "pockets" of fabric with one open side, that side being along the longitudinal edges of the fabric. With the springs still in their fully-compressed state, the portion of ply 36 which extends over ply 34 receives adhesive and is then folded over ply 36 at 80, thus completely closing the pockets of fabric with the springs inside. The springs are later allowed to open into the configuration shown in FIG. 8. Although the longitudinal seam of the pocketed coil springs do not extend axially or radially, it may be seen that this configuration requires the springs to be severely compressed during their insertion. Similarly, waste of material is evident as shown in the final configuration of FIG. 8, in which the transverse sew liens are not parallel to the longitudinal axes of the springs, but instead are orthogonal to the longitudinal axes of the springs, thus requiring the fabric to buckle and wrinkle to accommodate the springs.

In U.S. Pat. No. 4,485,506, in which I was a co-inventor, entitled "COIL SPRING CONSTRUCTION", a coil spring construction is provided for incorporation within a mattress or a cushion. The construction includes a plurality of independently mounted pocketed coil springs. Resilient stabilizers are provided between the springs to maintain their axial positions. The spring pockets are formed by the sealing of first and second sheets to each other in a substantially circular configuration about the longitudinal axis of the spring. Spring height is determined by the inside diameter of the seal. It should be noted that this disclosure notes that one advantage of this method is that the springs may simply be allowed to expand after insertion and do not require turning. As previously discussed, in methods where compressed springs are inserted into folded strips which are then stitched or welded in a rectangular pattern, the springs must be turned after insertion so that their axes are substantially colinear with the longitudinal axes of the resulting pockets. (col. 2, lines 49–60).

Disadvantages in the Prior Art

Although the above-discussed patents provide configurations which include distinct advantages, it should be understood that some shortcomings do also exist, especially in light of the methods used in assembling the strings into mattress or cushion configurations. It should be understood that the pocketed coil strings which include radially-extending seams such as those shown in U.S. Pat. No. 3,462,779, can present difficulties when positioned alongside similar strings, as the seams can prevent the sides of the springs from being closely positioned adjacent to each other. However, pocketed coil strings having axially-extending seams such as that shown in my U.S. Pat. No. 4,234,983, although possessing distinct advantages, can produce a phenomenon known as "false loft" when positioned alongside other strings to provide a cushion or mattress as shown in my U.S. Pat. No. 4,578,834.

When comprehending "false loft", one should understand that mattress construction such as that described in U.S. Pat. No. 4,578,834 typically include the above-described spring base, with at least one layer of fabric positioned intermediate the ends of the springs and the intended sleeping surface. False loft occurs when the axially-extending seams maintain the cover material a certain distance away from the ends of the springs. When the mattress is first purchased, this distance is fairly uniform. However, after the mattress or cushion has been in use for a period of time, the axially-extending seams may become "crushed", thus leaving a type of body depression. With continued use of the mattress or cushion, entire support surface of the mattress or cushion will similarly be crushed, and the support surface of the mattress or cushion will then appear substantially flat. However, the customer, upon observing a body depression, may not realize that the support surface will flatten out with time, and may interpret the body depression as being a mattress or cushion defect, which may result in the mattress or cushion being returned to the point of sale. Although the customer may be subsequently educated as to the phenomenon of "false loft", it would extremely advantageous to provide a mattress or cushion configuration which does not exhibit such a a mattress or cushion configuration which does not exibit such a phenomenon.

The configurations which require the springs to undergo severe axial compression during insertion into fabric pockets possess severe disadvantages as they may allow the springs to become tangled or "hooked" on themselves instead of expanding to their desired position. Therefore additional labor is required to "unhook" the springs to allow them to expand as desired.

Finally, the configurations which require turning of the springs after insertion into the pockets also possess disadvantages in that the springs may not be accurately positioned during the turning process, thus resulting in the assembly of pocketed coil strings which may have springs which are not axially aligned.

Therefore, it may be seen that a need exists for a pocketed coil string which overcomes the disadvantages in the prior art by providing a seam configuration which does not interfere with the assembly of the coil strings alongside similar coil strings, and also does not provide the phenomenon known as "false loft". Furthermore, it can be seen that a need exists for a method of assembly of pocketed coil strings which does not require turning of the springs after insertion of the springs into their respective pockets. Finally, a need has always existed to provide mattress materials which are cost-and-labor effective in that they require a minimum amount of materials and labor.

SUMMARY OF THE INVENTION

The present invention overcomes the above-discussed disadvantages in the prior art by providing a pocketed coil string construction which is effective in performance, yet cost-effective in that it requires a minimum amount of materials and labor. Furthermore, the present invention provides a pocketed coil string construction which does not include outwardly-protruding seams. The manner in which the spring is situated within the fabric pockets allows a minimal amount of fabric to be used, and the manner in which the springs are inserted into the pockets insures effective placement of the springs within the pockets, without the requirement that the springs be "beaten" or otherwise turned after positioning within the pockets. The final positioning of the springs relative to the seams is such that the seam axes are substantially parallel to the longitudinal axes of the springs, thus allowing the fabric to lie flat on the springs without buckling or wrinkling.

Thus, it is an object of the present invention to provide an improved string of pocketed coils.

It is a further object of the present invention to provide pocketed coil string which is cost-effective.

It is a further object of the present invention to provide a pocketed coil string which does not produce the phenomenon known as "false loft".

It is a further object of the present invention to provide an improved method and apparatus for providing pocketed coil string.

It is a further object of the present invention to provide pocketed coil strings which require minimal amounts of pocket material for enclosing the springs.

It is a further object of the present invention to provide a method of inserting springs within fabric pockets without the need for manipulating the springs once the pockets have been sealed.

It is a further object of the present invention to provide a method of assembling pocketed coil strings which does not require excessive compression of the springs during their insertion into the pocketing fabric.

It is a further object of the present invention to provide a method of assembling pocketed coil strings which does not allow the springs to become "hooked" on themselves due to excessive compression.

It is a further object of the present invention to provide pocketed coil strings which include transverse seams having axes substantially parallel to the longitudinal axes of the springs, thus encouraging efficient placement of the springs into their respective pockets without excessive buckling or folding of the fabric.

Other objects, features, and advantages of the present invention will become apparent upon reading the following detailed description of the preferred embodiment of the invention when taken in conjunction with the drawings and the appended claims.

DETAILED DESCRIPTION OF THE PREFERRED EMBODIMENTS

General Discussion of Spring Transfer Relative to Fabric Strip

Figure 1:
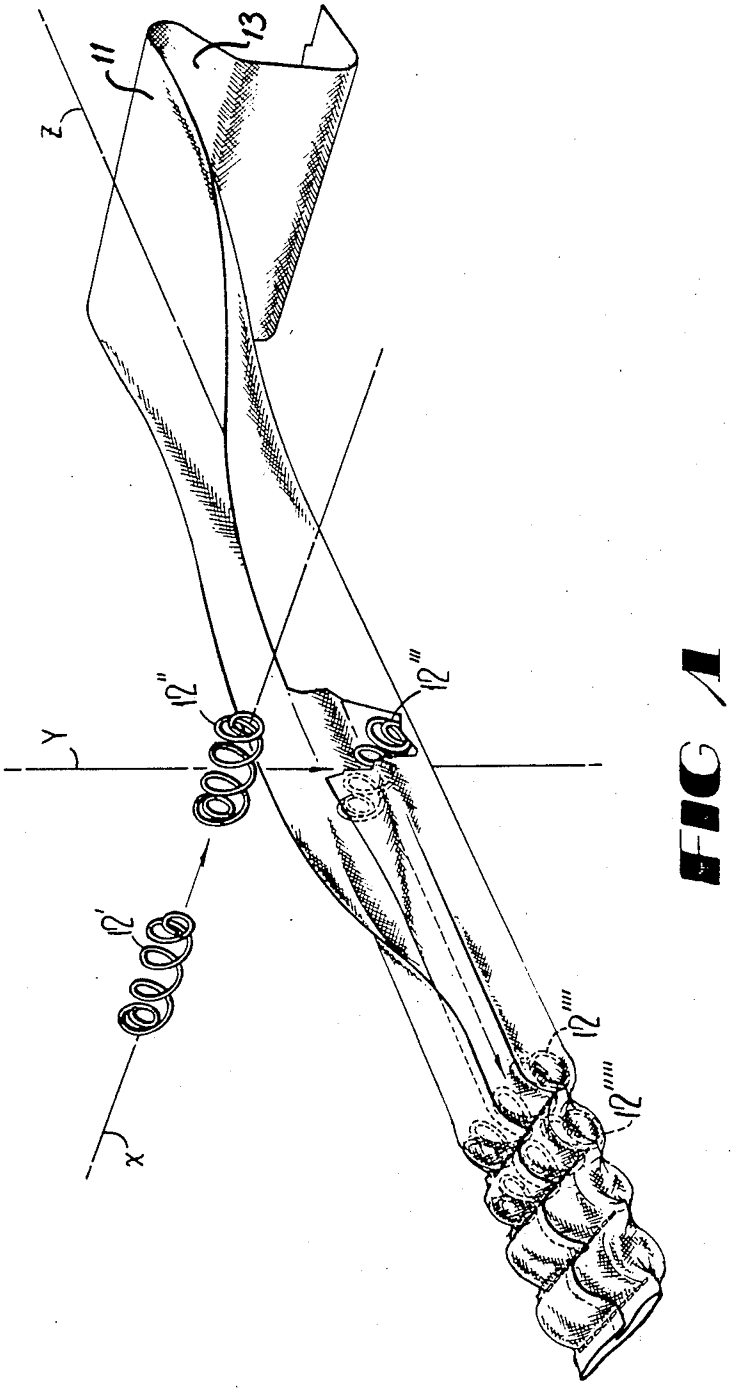
FIG. 1 is an illustrative view of the manner in which the springs are inserted within the fabric.

Referring now to the drawings, in which like numerals represent like parts throughout the several views, FIG. 1 shows the general manner in which coil springs 12, referred to now only as springs 12 are placed within a strip of pocket fabric 14 having opposing faces 11, 13. For purposes of this application, the springs will be referred to as each having a "longitudinal" axis, which is the axis around which the wire is coiled and along which the spring is compressed. A spring 12 first begins at position 12', with its longitudinal axis being substantially horizontal. The spring is first urged from position 12' along axis X (which in the embodiment of FIG. 1 is substantially horizontal and substantially colinear to the longitudinal axes of the spring when in position 12') until it reaches a position as shown in 12", wherein it is then positioned along axis X and axis Y. The spring as positioned in 12" is then urged downwardly along axis Y (which in the preferred embodiment is substantially vertical), until it reaches a position as shown in 12"', wherein it is then positioned along axis Y and axis Z. The spring is then urged along axis Z (which in the embodiment of FIG. 1 is substantially horizontal and orthogonal to axis X) until it reaches position 12"", wherein it "bottoms out" against a previously-provided seam in the fabric 14, as will be discussed in detail further in this application.

It may be seen in FIG. 1 that as the springs 12 go from position 12" to 12"', they enter into a fabric "trough" as discussed in further detail later in this application. As the spring passes from position 12"' to 12"", it passes from within a "trough-type" configuration of the fabric to a portion of the fabric which is in a substantially rectangular and tube-like configuration. After the spring reaches position 12"", the fabric is brought together behind the spring and transversely sealed, thus providing a "pocket" within which the spring is retained, similar to the spring positioned at 12"".

It should be understood that although terms such as "horizontal ", "vertical", "up", "down", and other similar terms are used in describing the preferred orientation of the preferred embodiment of the invention, it should be understood that the preferred embodiment could be orientated in different manners as known by those skilled in the art.

General Operation of Apparatus 10

Figure 2:
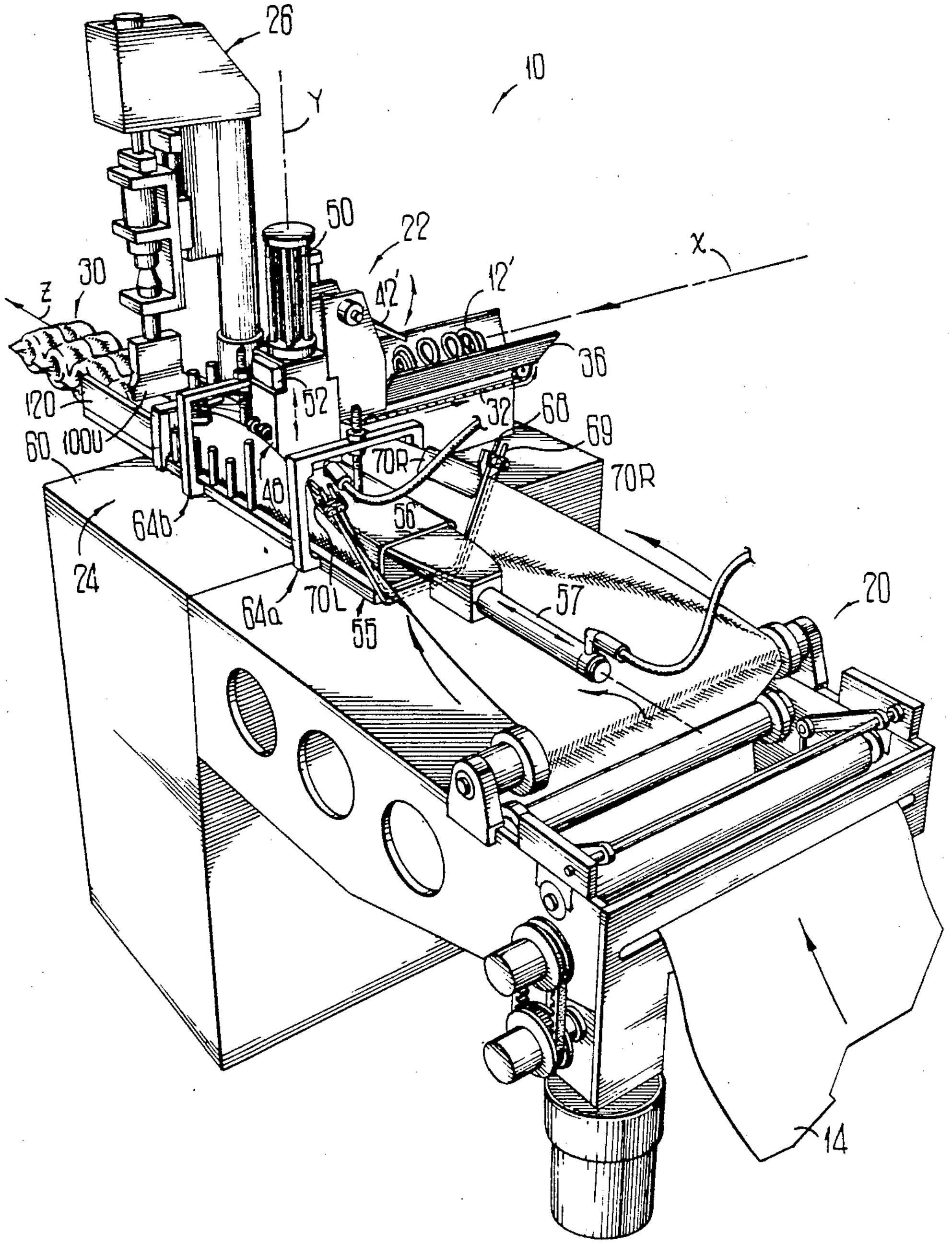
FIG. 2 is an elevational view of the apparatus for forming series connected pocketed coils in accordance with the present invention.

Referring now to FIG. 2, it may be seen that the apparatus 10 may be considered to have various sub-assemblies, including fabric feeding assembly 20, spring feeding assembly 22, spring inserting assembly 24, and thermal weld station 26. A simplified discussion of the operation of apparatus 10 will now be made with reference to such sub-assemblies, although a more detailed discussed of the sub-assemblies will follow.

Figure 7:
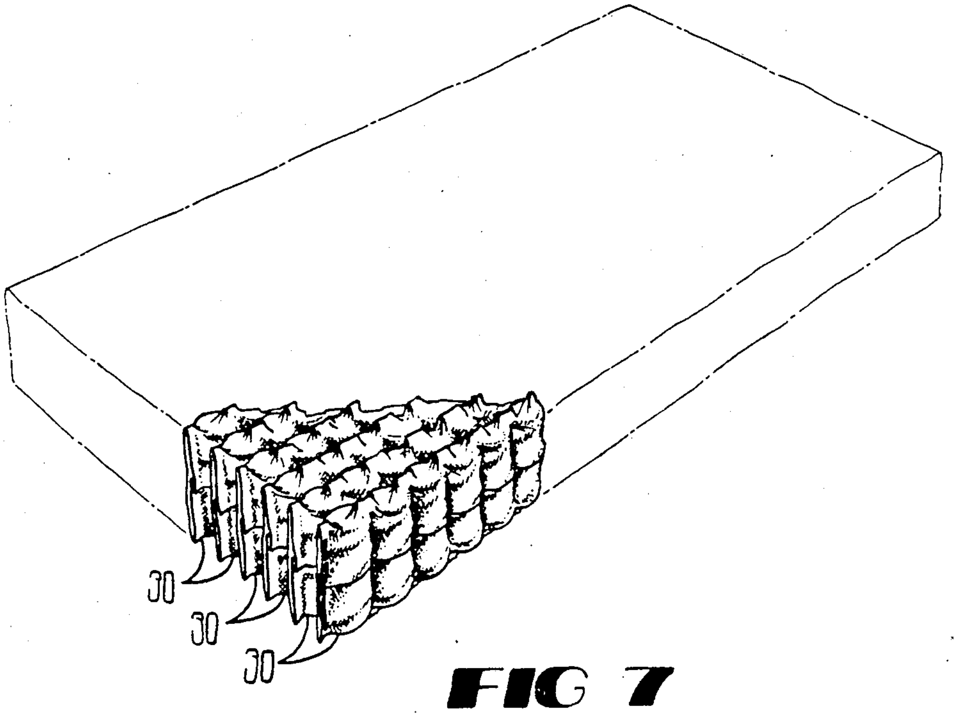
FIG. 7 is a view of the pocketed coil strings as used to form a mattress construction.

Fabric feeding assembly 20 feeds the fabric strip 14 toward the spring feeding assembly 22 and spring inserting assembly 24. Spring feeding assembly 22 accepts a spring from position 12', and guides the spring along axis X, and thereafter along axis Y until the spring is then passed to the spring inserting assembly 24 at position 12"'. The spring inserting assembly 24 urges the spring from position 12"' (not shown in FIG. 2, but shown in FIG. 1), and urges it along axis Z until it is positioned at 12"", upon which thermal weld station 26 provides a transverse weld behind the spring. The spring 12 is then encapsulated within a "pocket" of fabric. The spring 12 then is fed away from the apparatus assembly 10 along with adjacently-positioned springs, in a formation now referred to as a pocketed coil string 30. These pocketed coil strings 30 may then be readily handled, and positioned in mattress configurations as desired. Such uses of such strips are shown in FIG. 7, applicant's U.S. Pat. No. 4,451,946, herein incorporated by reference, applicant's U.S. Pat. No. 4,401,501, herein incorporated by reference, applicant's U.S. Pat. No. 4,578,834, herein incorporated by reference, and applicant's U.S. Pat. No. 4,566,926, herein incorporated by reference.

The fabric feeding assembly 20 is configured to feed fabric 14 at a desired rate and at a relatively constant tension, in a manner known to those skilled in the art. An example of such an assembly 20 is shown in applicant's U.S. Pat. No. 4,439,977, in particular FIGS. 5 through 7, As the fabric strip 14 exits the fabric feeding assembly 20, it may be seen that it is substantially horizontal and planar, is traveling in a generally "downstream" manner, and travelling in a direction substantially parallel to axis Z.

At the same time spring 12 is moving from position 12' to position 12"", the fabric strip is also being fed at a controlled rate. After reaching position 12"", the springs 12 are positioned within pockets formed by the fabric 14, and thereafter the springs 12 move at the same rate as the fabric 14. Therefore, when discussing the more detailed operation of the fabric feeding assembly 20, firstly the travel of the springs 12 from position 12' to 12"" will be discussed in a detailed manner, and travel of the fabric just prior to forming complete pockets will be discussed, and then the final formation of the pocketed coil string 30 will be discussed.

Spring Travel

Referring now to FIG. 2, spring 12 is first positioned at 12' in apparatus 10 in the spring feeding assembly 22. Such springs may be provided by a spring coiler assembly (not shown) by a manner known to those skilled in the art. An example of such a spring coiler assembly is shown in applicants' U.S. Pat. No. 4,439,977, most particularly discussed in columns 6 and 7.

Figure 3A:
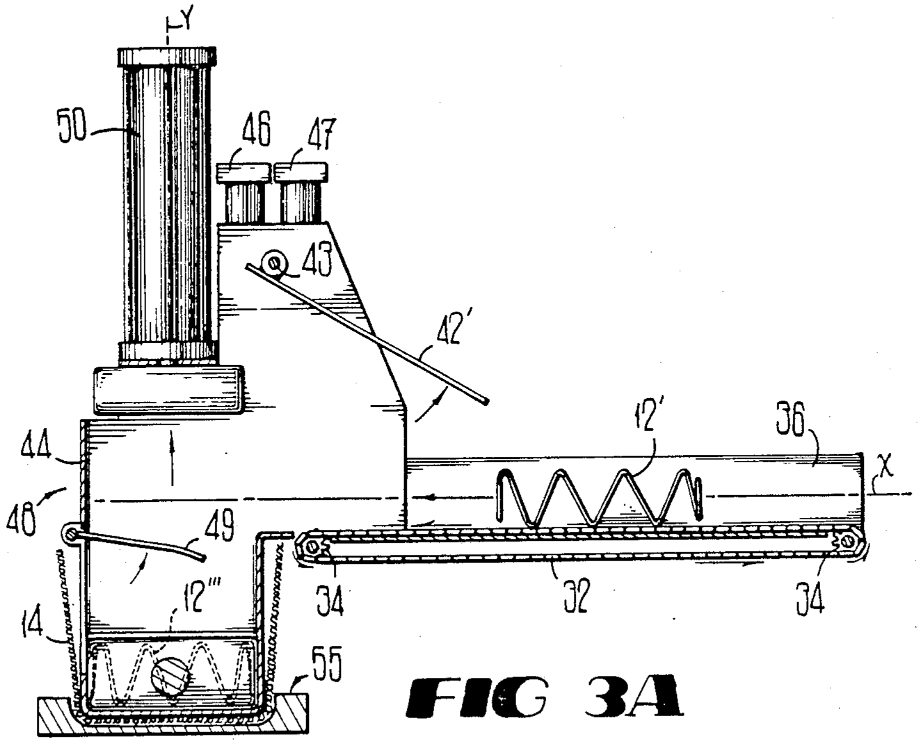
FIGS. 3A, 3B, and 3C are isolated, partially cut-away plan views of the spring loading sub-assembly, as viewed from the upstream side of the overall assembly in various stages of operation.
Figure 3B:
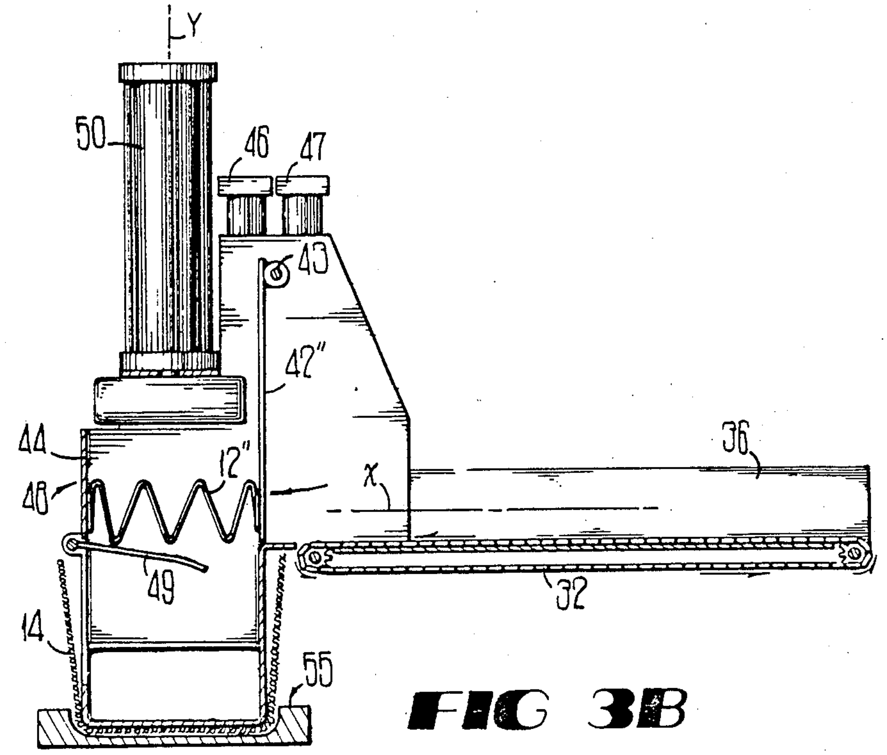
Figure 4:
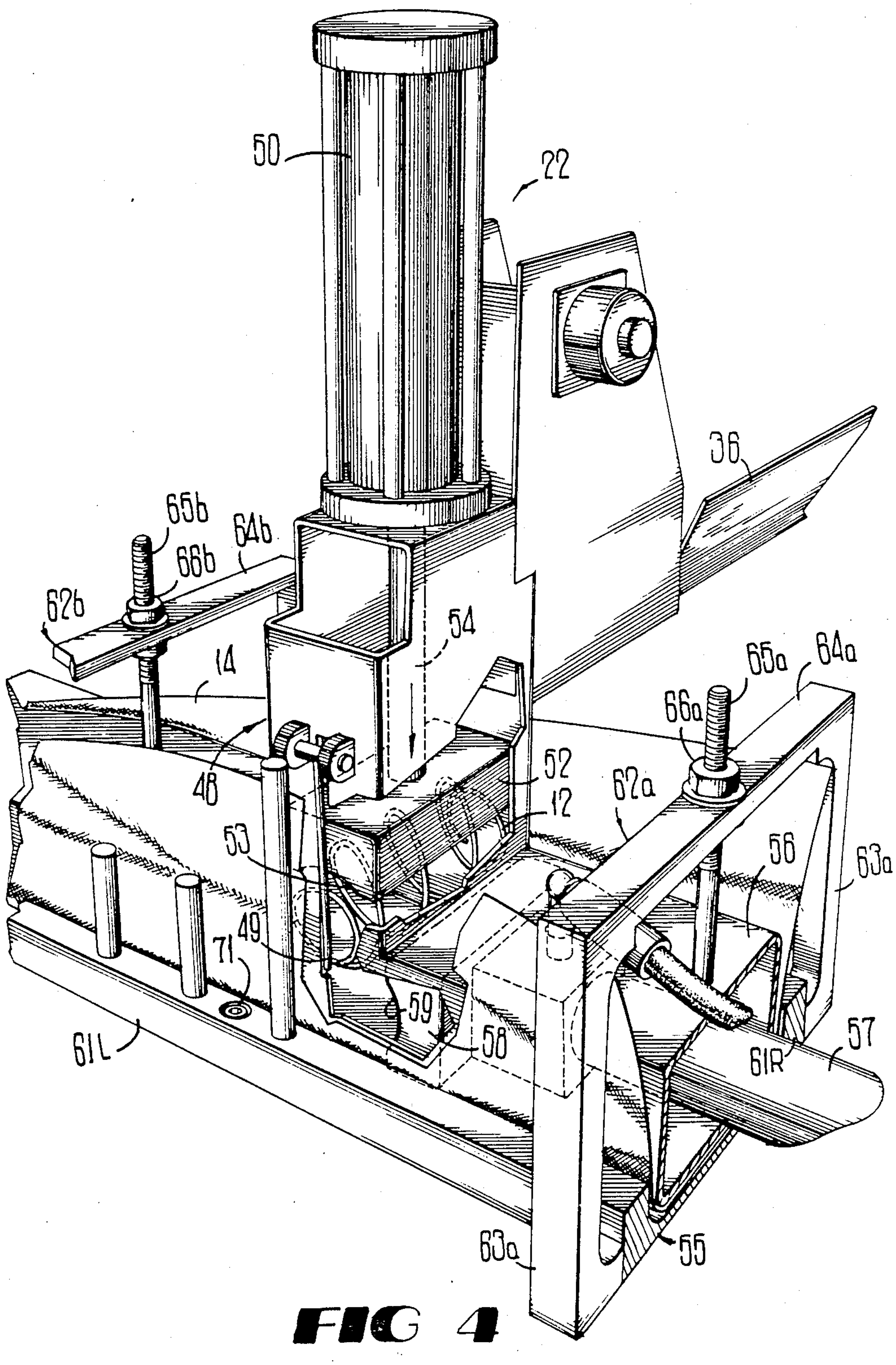
FIG. 4 is an isolated, partially cut-away perspective view of the sub-assembly shown in FIGS. 3A–3C showing its interaction with the mandrel.

Referring now to FIG. 3A, the springs 12 are transferred from position 12' along axis X by a chain conveyor 32, mounted on sprockets 34, or by transfer means known by those skilled in the art. Trough side walls 36 are provided on each side of the chain conveyor 32 as a spring guide means. These trough side walls 36 taper outwardly (as shown in FIG. 4), although other configurations known to those skilled in the art may be used. As the spring 12 travels along chain conveyor 32 along axis X, a compressing flap 42 is pivoted into its open position 42' about the longitudinal axis of shaft 43 (see FIG. 3A) in order that the spring 12 may pass thereunder. The longitudinal axis of shaft 43 is substantially normal to the plane of FIG. 3A. Referring now to FIGS. 3A and 3B, the spring 12 continues its travel until its leading end abuts wall 44. Thereafter, compressing flap 42 is pivoted downwardly into its compressing position 42", thus contacting the trailing end of the spring 12 and compressing it. Single-acting pneumatic air cylinders 46, 47 are used to facilitate the movement of compressing flap 42 back and forth between positions 42' and 42", with one cylinder facilitating the movement of the flap from position 42' to position 42", and the other cylinder providing movement in the opposite direction. However, it should be understood that other means known in the art may be used. A downwardly-deflectable intermittent support member 49 is provided as a temporary support to maintain spring 12 in position 12". However, this member is gravity- or spring-loaded in order to allow it to pivot downwardly when encountering a predetermined downward force as discussed later in this application.

When compressing flap 42 reaches its position as shown in 42", it may be seen that the spring 12, now in position 12", is now in a compressed state, which may also be referred to as a "preloaded" state. It should be noted that this preloaded state is approximately the greatest compression the spring will endure during the assembly process. This is one important feature of the invention as other machines require that the spring be compressed in a much greater manner, thereby allowing it to "hook" on itself (become entangled), thus requiring labor-intensive attention to the spring in order to "unhook" them to their desired state. As discussed later, the springs will later be allowed to expand to a second preloaded state which will be an operating state.

Wall 44 is part of a tubular sleeve 48, which has a bore which is substantially rectangular in transverse cross section, with the bore axis being substantially parallel to axis Y. The rectangular transverse cross section is configured to accept typical springs 12 to allow transfer of the springs along the bore axis of the sleeve 48 with the longitudinal axes of the springs being substantially perpendicular to axis Y. Sleeve 48 is fastened to mandrel 56, which similarly is elongate and tubular, and has a bore which is substantially rectangular in transverse cross section. Referring particularly to FIG. 4, sleeve 48 has its lower end attached to the upper surface of mandrel 56, such that the bore axis of sleeve 48 is substantially parallel to axis Y and the bore axis of mandrel 56 is substantially parallel to axis Z. At the point of connection between sleeve 48 and mandrel 56, an opening in the upper horizontal surface of mandrel 56 is provided to allow the passage of springs from within sleeve 48 into the bore of mandrel 56.

When the springs have reached their position 12" as shown in FIG. 3B, it may be seen that the springs travel no further along axis X. Instead, they begin their travel downward within sleeve 48 along axis Y, as illustrated in reference to FIGS. 3B and 3C, such that the longitudinal axes of the springs 12 are substantially perpendicular to axis Y. A double-acting pneumatic air cylinder 50 having a stroke substantially parallel to axis Y, has a head 52 attached to the end of the cylinder rod 54 which slidably fits within the bore of sleeve 48. As the cylinder is actuated into its "down" stroke, the head urges the spring 12 from its position 12" to position 12'''. It may be seen that the intermittent support 49 is pushed out of the way during this downward stroke process. Referring now to FIG. 4, the position of a spring 12 is shown intermediate positions 12" and 12''', with the directional arrow shown on rod 54 illustrating the downward stroke of the double-acting cylinder. FIG. 4 also shows the arcuate portion 53 which is defined by the lower surface of the head 52. This arcuate portion 53 is configured to conform somewhat to the arcuate configuration of the springs 12 in use. It should be understood, as the invention contemplates the use of different spring shapes, different arcuate portions 53 may be provided to accept such different spring configurations.

Figure 3C:
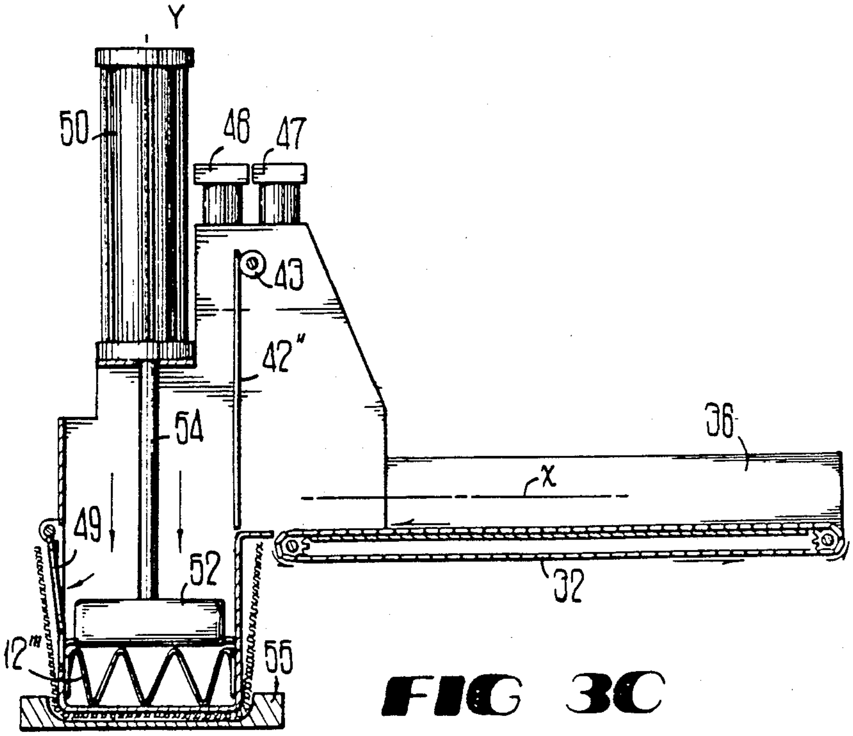

Referring now to FIGS. 3B, 3C and 4, as the head 52 urges the spring 12 downwardly, the spring 12 urges the intermittent support 49 from its position shown in FIG. 3B to its position shown in FIG. 3C. The head 52 finally urges the spring to its position 12''', upon which the cylinder 50 then retracts upwardly, into its position as shown in FIG. 3A. With the spring 12 shown in its position 12''' in FIG. 3C, it should now be understood that the spring 12 is now within mandrel 56, an element of previously-discussed spring inserting assembly 24.

Referring now to FIGS. 2 and 4, spring inserting assembly 24 includes the mandrel 56, supported above support surface 60 by suspension assemblies 62A, 62B, and also includes a double-acting pneumatic cylinder 57, which drives a head 58 along a path substantially parallel to axis Z. As previously discussed, mandrel 56 is tubular, elongate, and has a bore having a substantially rectangular transverse cross section, which is illustrated in dotted line at 56' in FIG. 5. Head 58 slidably fits within the bore of mandrel 56. Head 58 also has an arcuate portion 59 (similar to previously-discussed head 52), which conforms somewhat to the arcuate configuration of the springs. As in arcuate portion 53, arcuate portion 59 may be altered to conform to different spring configurations.

Figure 5:
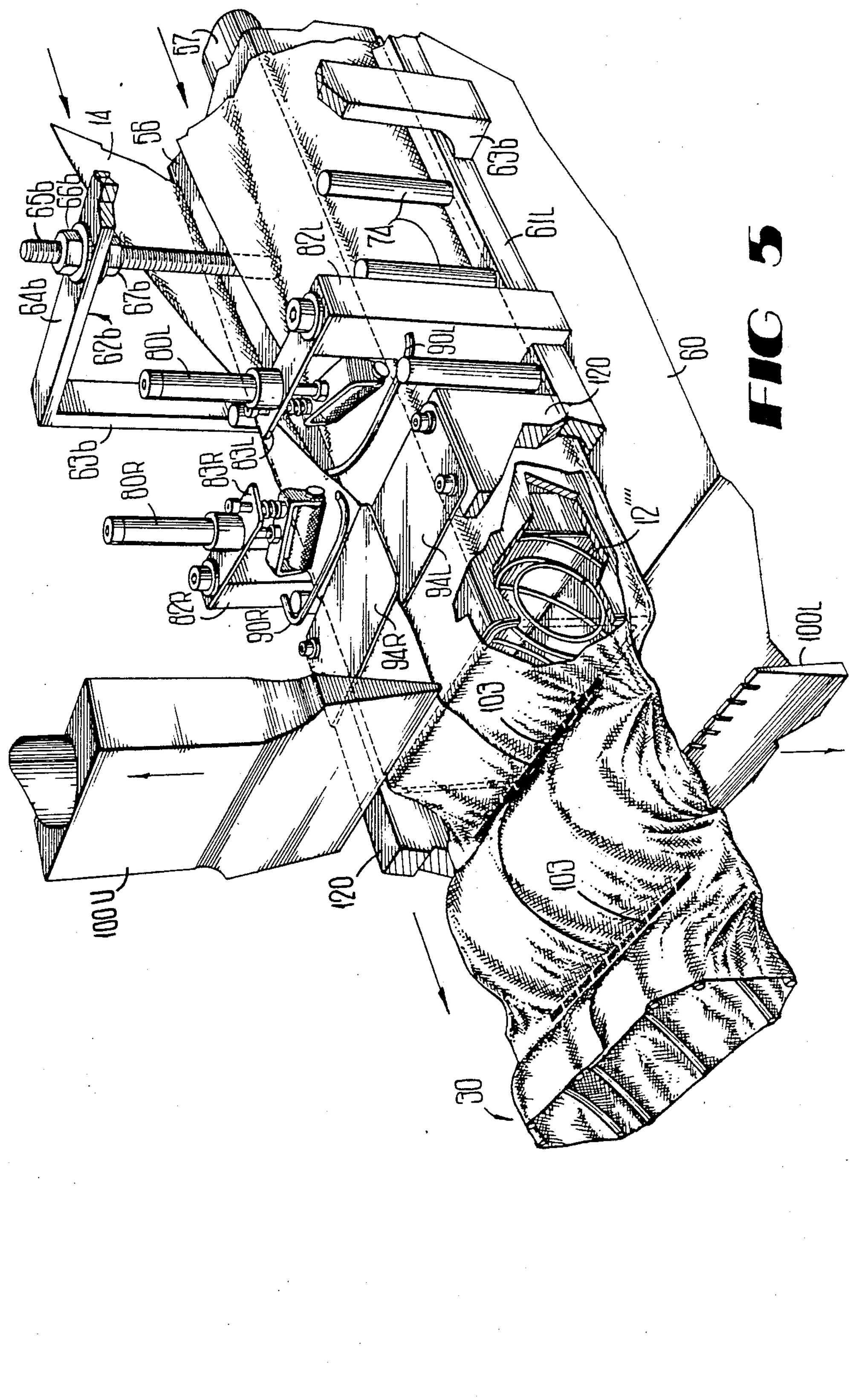
FIG. 5 is an isolated view of the end of the mandrel, showing the action of the welding heads.

Referring now to FIGS. 2 and 5, it may be seen that the mandrel 56 is suspended above support surface 60 in order that fabric 14 may be guided around the mandrel such that the fabric assumes the shape of the outer surface of the mandrel 56. Therefore, it may be understood that as the spring 12 is transferred to position 12''', the fabric 14 is also being guided around the spring. The spring is substantially surrounded by a tube of fabric when it reaches position 12''''. This process of guiding the fabric around the outer surface of mandrel 56 will now be discussed.

For purposes of this application, various references may be made to elements being "left" or "right" relative to a particular element. Similarly references may be made to "upstream" or "downstream" positions along the overall apparatus 10. It will be understood that the fabric 14, which travels from one end of the overall apparatus 10 to another end, will be traveling from the "upstream" side of the overall apparatus 10 to the "downstream" side of the machine. The references "left" or "right" are made as if one is standing at the "upstream" side of the overall apparatus 10 and viewing the machine along the same general axis as the axis of travel of the fabric strip 14 from the upstream side of the overall apparatus to the downstream side of the overall apparatus 10. Of course, it should be understood that such terms "left" and "right" are merely relative as to the point of reference of the viewer.

Referring to FIG. 2, the fabric 14 is drawn downstream from a substantially flat configuration from the fabric feeding assembly 20 and is initially formed into an upwardly-disposed "trough", by inner and outer preliminary guides 68, 69, respectively, positioned adjacent the leading end of mandrel 56. Preliminary guides 68, 69, are generally trough-shaped as shown in FIG. 2, formed from lengths of rod, and are positioned in a "nested" configuration relative to each other such that a trough-shaped slot is defined between the guides 68, 69. Right and left U-shaped edge guides 70L 70R, are mounted to the ends of the guides and may be adjusted along the length of the upwardly-extending ends of the guides. It may be seen that as the fabric is drawn through the slot defined by the preliminary guides 68, 69, the U-shaped edge guides 70L, 70R, retain the edges of the fabric strip 14, while the rest of the fabric strip 14 assumes the shape of the defined slot.

After the fabric passes through the guides 68, 69, the center of the fabric is maintained in a relatively flat configuration, as it is then positioned intermediate the lower horizontal surface of the mandrel 56, and a channel member 55, which is positioned under the mandrel and runs the length of the mandrel, and is fastened to the support surface 60 by fasteners 71 or other means known in the art. It should be understood that the channel 55 has an upwardly-disposed cavity which substantially conforms to the lower outside surface of the mandrel 56. As shown in FIG. 3B, the channel 55 is spaced-apart from the mandrel 56 such that a small gap exists therebetween which allows the fabric strip 14 to be guided therebetween, and substantially follow the contour of the lower outside horizontal surface of the mandrel 56.

Suspension assemblies 62A, 62B, are similar in configuration, and combine to maintain the mandrel spaced above the channel 55. Referring now to FIG. 4, suspension assembly **62*a* includes two vertical members 63*a*, which extend upwardly on either side of the mandrel, and also includes a single horizontal member 64*a*, which is rigidly affixed to the upper end of each of the vertical members 63*a* and is positioned above the mandrel. Vertical members 63*a* are rigidly fixed to side walls 61L, 61R of channel member 55. A threaded rod 65*a* has its lower end rigidly affixed to the upper horizontal surface of the mandrel 56, by welding or other means known to those skilled in the art. The upper end of threaded rod 65*a* passes through a hole (not shown) in vertical member 64*a*, and is threadably engaged by upper and lower adjusting nuts 66*a*, 67*a*, respectively. It may be seen that by adjusting the position of upper and lower adjusting nuts 66*a*, 67*a* along the length of threaded rod 65*a*, the leading end of mandrel 56 may be similarly adjusted relative to channel 55, as the mandrel is fixed to threaded rod 65*a*. Upper and lower adjusting nuts 66*a*, 67*a*, bias against opposing sides horizontal member 64*a* when the mandrel 56** is adjusted in its desired and fixed position.

It should be understood that suspension assembly **62*b* operates in a manner similar to assembly 62*a*, in adjusting the height of the trailing end of the mandrel 56**.

As previously discussed, it may be seen that preliminary guides 68, 69, each accept opposite edges of the fabric strip 14. At this point, the "trough"-like configuration of the fabric strip 14 is such that the bottom of the "trough" is substantially flat (conforming to the lower outer horizontal surface of the mandrel 56), and the edges of the fabric "trough" taper upwardly and outwardly. After the fabric strip 14 passes the preliminary guides 68, 69, the trough configuration of the fabric is altered such that the sides of the fabric "trough" are guided such that they are at substantially right angles to the floor of the fabric trough and parallel to each other. As shown in FIG. 5, this guiding function is assisted by rollers 74L, 74R, adjacent the vertical sides of the mandrel 56. The rollers 74L, 74R, are rotatably mounted upon upwardly-extending pins (not shown), which are also rigidly mounted to side walls 61L, 61R, respectively, of channel 55. It may be seen that, as the fabric passes between the side rollers 74, and the horizontal sides of the mandrel 56, the fabric is guided such that the fabric follows not only the lower horizontal surface of the mandrel 56, but now also the horizontal sides of the mandrel 56. The rollers 74 are freely mounted about the pins, and rotate only in response to movement of the fabric adjacent to the rollers.

As previously discussed, as the fabric passes between the lower outer horizontal surface of the mandrel 56 and the channel 55, it may be seen that, as this gap is relatively small, a portion of the fabric strip 14 substantially conforms to the lower outer horizontal surface of the mandrel 56. Also, as previously discussed, the rollers 74 urge another portion of the fabric strip to follow the vertical outside surfaces of the mandrel 56. However, further guide means are used in order to completely wrap the fabric strip 14 around the outer perimeter of the mandrel 56, in order that the fabric substantially follows the outside peripheral surface of the mandrel 56, with some overlap of the edges of the fabric strip 14 occuring on the top horizontal outer surface of the mandrel 56.

Two edge gathering assemblies 80L, 80R, positioned on each side of the mandrel downstream from suspension assembly 62B, serve to "gather" the edges of the fabric strip in order to guide the from a "trough" transverse cross-sectional configuration to the desired rectangular-shaped transverse cross-sectional configuration. Edge gathering assembly 80R is positioned on the right hand side of the mandrel, as the overall apparatus 10 is viewed from its upstream end. Similarly, edge gathering assembly 80L is on the left hand side of the mandrel, and contacts the fabric strip 14 adjacent its "left" edge. Knurled edge gathering assemblies 80L, 80R, are similar in configuration.

Edge gathering assembly 80R includes a substantially vertical member 82R, a substantially horizontal member 83R, and a knurled roller 88R. Vertical member 82R has its lower end rigidly affixed to anchor bar 61R. Horizontal member 83R has one end affixed to the upper end of vertical member 82R, and has its second end extending over mandrel 56. Knurled roller 88R extends from horizontal member 83R, such that the knurled roller 88R is in contact with the fabric strip 14 adjacent its right edge such that the right edge of the fabric strip 14 is pinched between the knurled roller 88R and the upper surface of mandrel 56. A spring, or other means known in the art, provides downward bias for the knurled roller 88R. Knurled roller 88R is oriented angled inwardly such that as the fabric strip 14 passes between the knurled roller 88R and the upper surface of the mandrel 56, the knurled roller 88R "gathers" the right edge of the fabric toward the center of the upper horizontal surface of the mandrel 56, such that the fabric approaches the previously-described overlapping configuration around the mandrel 56. It should also be interested that the orientation of knurled roller 88L, is such that the left edged of the fabric strip 14 is similarly "gathered" toward the center of the upper horizontal surface of the mandrel 56. The knurled rollers 88L, 88R are rotatably mounted relative to the horizontal member 83B by means known in the art. The angle of the knurled rollers relative to the fabric may be adjusted by means known in the art, but an angle of approximately 10° has been found acceptable in some situations.

Biasing rods 90R, 90L, are positioned on the right- and left-hand sides of the mandrel, respectively, and are also positioned just downstream from the edge gathering assemblies 80R, 80L, respectively. These biasing rods urge the fabric downwardly and against the upper horizontal outer surface of the mandrel 56. Just downstream from the biasing rods 90R, 90L, flattening plates 94R, 94L, respectively, are positioned on the right- and left-hand sides of the mandrel, respectively. These plates further urge the edges of the fabric downwardly, such that the fabric even more closely assumes the outer shape of the mandrel 56.

It may be seen that as the fabric continues past the flattening plates 94R, 94L, the fabric is at the desired "overlapping" configuration with a portion of face 11 facing a portion of face 13 at location 15 (see FIG. 1). As will be discussed later in this application, the cavity formed within the tubular configuration of the fabric is sufficient in size to accept a preloaded spring 12 as it exits the downstream end of mandrel 56.

As the fabric continues past the flattening plates 94R, 94L, it then passes over and beyond the downstream end of the mandrel 56 in its now tubular-shaped configuration. A transverse seam is then provided to the fabric strip 14 by thermal weld station 26. The fabric strip 14 is made of a material which, when welded by weld heads 100U, 100L forms a weld.

Thermal weld station 26 includes upper and lower weld heads 100U, 100L, respectively, which may be used to "pinch" the tubular fabric strip 14 closed in order that a transverse weld line is provided across the fabric strip.

Weld heads to provide such transverse welding are shown in applicant's U.S. Pat. No. 4,439,977, particularly as described in columns 8 and 9. However, it should be understood that other means may be used to provide such a transverse weld. For example, mechanical fastening means such as staples could be used, or glue could be used to seal the fabric together.

It should also be understood that it it not necessary that a continuous transverse weld be provided. Intermittent welds could be provided in manners known in the art. Similarly, it is only necessary that the weld provide a means for restricting movement of the spring along the length of the tube, which combined with the opposing weld, maintains the springs in the desired orientation.

Similarly, the term "transverse" is meant to describe a seam which extends across the longitudinal axis of the tubular material, and seals the tube of material. Although the transverse weld is substantially perpendicular to the longitudinal axis of the tubular material in the preferred embodiment, it should be understood that seams with other angular relationships are contemplated as being transverse. Again, it is only necessary that the weld provide a means for restricting movement of the spring along the length of the tube, which combined with the opposing weld, maintains the springs in the desired orientation.

Discussion of the transfer of springs 12 from position 12''' to position 12'''' is now made in reference to FIGS. 4 and 5. Spring inserting assembly 24 includes a double-acting pneumatic cylinder 57 which urges head 58 upstream and downstream along the bore of mandrel 56, the path of travel being substantially parallel to axis Z. As the cylinder 57 is actuated in its "downstream" stroke, it urges spring 12 from position 12''' to position 12'''', wherein the spring "bottoms out" on a seam which has just been previously provided by the thermal weld station 26. As the cylinder continues to stroke, the spring is urged against the seam such that the fabric (and spring) is likewise displaced downstream until the spring has passed the welding heads 100. After the spring has passed the welding heads, the pneumatic cylinder 57 retracts such that the head is then upstream of the welding heads, and the welding heads then pinch the fabric together to form another seam 103 such that the spring is fully enclosed, with a transverse seam 103 being provided on both the upstream and downstream sides of the spring. The spring is now referred to as being "pocketed" by the fabric.

Figure 6:
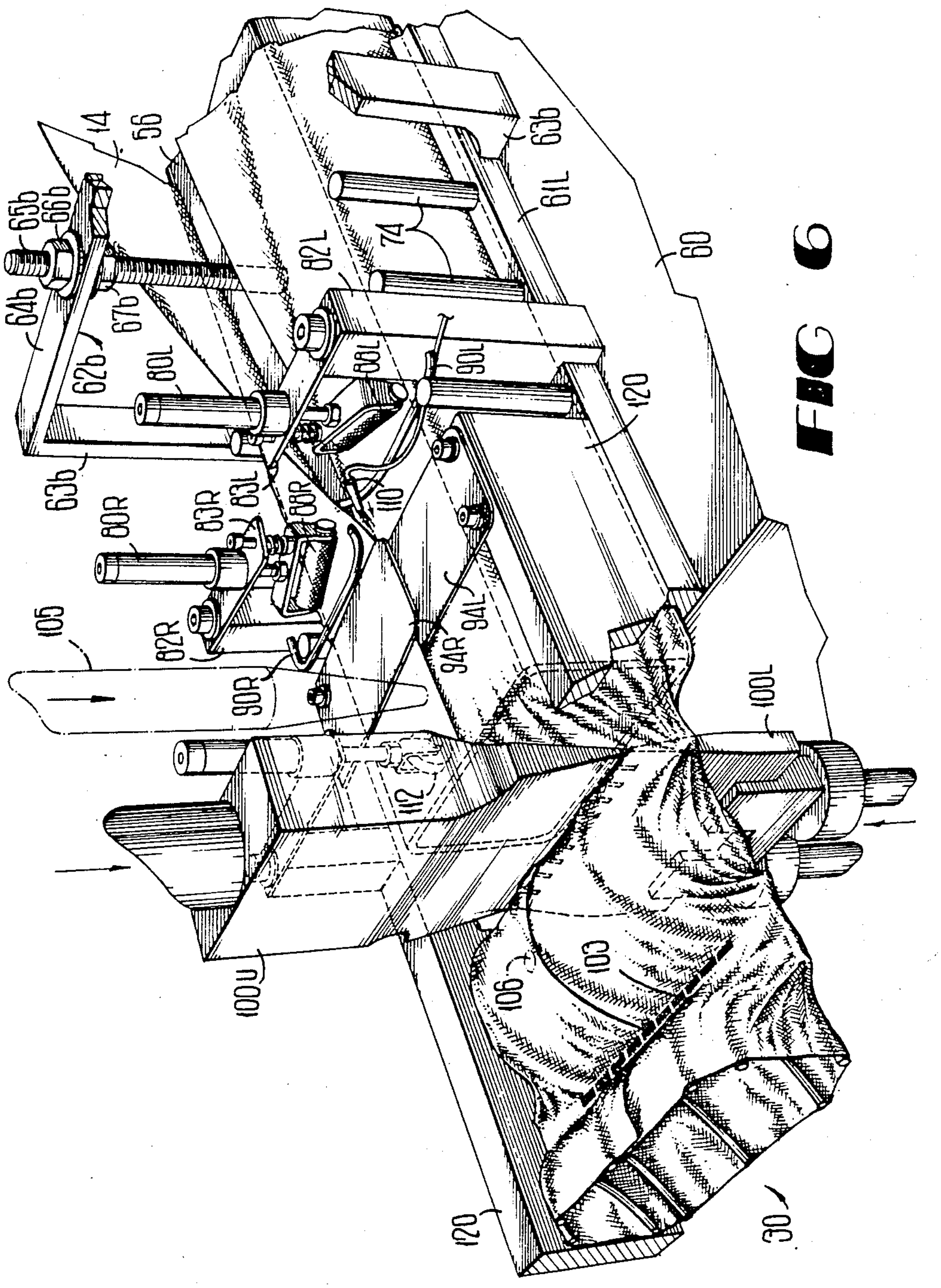
FIG. 6 is a view similar to FIG. 5, except that it shows the weld heads in welding position and also shows means for at least partially closing the overlapping side seam.

Another spring is then processed in a manner as discused above, such that this spring is positioned adjacent to the previous spring. As this process is repeated, it may be seen that a string of pocketed coils 30 are provided. As shown in FIG. 6, although the springs have exited the mandrel, the springs which have just been pocketed are still maintained in a preloaded configuration by the cooperation of members 120, which are positioned on each side of the spring path just downstream of the weld station, upon which the ends of the springs bias. The members 120 allow the transverse weld lines (as well as any other welds made to form the fabric pockets) to cool or solidify as needed without encountering strain imparted from the compressive force exerted by the springs.

As the springs continue to be indexed past the weld station, the ends of the springs slide along the members 120, until, approximately three springs diameters downstream, the members 120 terminate. At this time the springs expand until restricted only by the fabric pockets, which at this time are strong enough to contain the springs. It should be understood that the springs should still be in a preloaded configuration, although not as loaded as when in mandrel. This final preloaded configuration is the "operating" configuration of the springs, that is, the springs operate in this configuration when installed into a mattress or cushion.

An example of the extent of spring preloading is as follows. A spring having an 8 inch unloaded height may be compressed to a height of 5 inches when within the mandrel, but extend to a height of 6 inches when allowed to extend to its operating configuration.

The configuration of this pocketed coil string 30 is of significant importance. It may be seen that the string does not include axially-or radially-extending seams, which provide several distinct advantages. The absence of axially-extending seams substantially reduces, if not eliminates, the occurance of "false loft" phenomena, and the absence of radially-extending seams makes assembly of the pocketed coil string 30 with other similar pocketed coil strings less difficult, as the smooth sides of the strings are easily abutted next to each other, without interference of radially-extending seams, as shown in FIG. 7. Furthermore, no turning or "beating" of the springs is required, and therefore the springs are more accurately positioned within their pockets with high efficiency. Finally, the transverse seams have axes substantially parallel to the longitudinal axes of the springs, thus allowing for a smooth-sided coil string which includes a minimum of wrinkling or buckling.

It should also be understood from the above that the springs encounter several "preloaded" configurations. The most severe preloading should be within the mandrel. When the springs exit the mandrel, they expand somewhat until restricted by the members 120. After exiting the members 120, the springs expand to a final or operating configuration within the pockets.

It may be seen that the above-discussed method of providing pocketed coil strings 30 only includes providing transverse welded seams 103. It has been found that, in most instances, these seams also referred to as "weld lines", are sufficient to maintain the springs within their pockets. However, in certain instances it may be desirable to further connect the fabric along its overlapping portion. FIG. 6 illustrates two alternate means for providing such a point of connection. One means of connection may be provided by applying continuous lines of glue along the portions of the fabric which will be in overlapping contact. Glue applicators such as 110 may be used, as well as means known to those skilled in the art. A downwardly-biased knurled roller assembly 112 is provided just downstream of the flattening plate 94, which serves to press the edges of the fabric together at the point of overlap. This method provides a continuous line of connection at the overlapping portion of the fabric 14.

Another means for providing a connection point along the overlapping seam of the fabric strip 14 may be provided by ultrasonic welding rod 105 (shown in phantom), which may provide a "spot" weld at 106, being a point where the edges of the fabric strip 14 overlap.

Variations from Preferred Embodiment

While this invention has been described in specific detail with particular reference to the disclosed embodiments, it will be understood that many variations and modifications may be effected within the spirit and scope of the invention as described in the appended claims.

One example of such modification would include the use of a single double-acting cylinder in place of two single-acting cylinders. Instead of thermal welding of the fabric, it should be understood that the transverse seams provided adjacent to the springs could be sewn.

As the invention contemplates the use of springs having various shapes and sizes, it should be understood that various elements of the apparatus 10 will require alteration in order to accommodate such differing configurations. For example, if it is desired to use a longer or wider spring 12, a different mandrel 56 may need to be used in order to facilitate proper transfer of the springs. It may be seen that this may readily be accomplished, due to the fact that the mandrel 56 is releasably attached relative to the support surface 60.

Summary

In light of the above, it may be understood that the present invention overcomes disadvantages in the prior art by providing a pocketed coil string construction which is effective in performance, yet cost effective in that it requires a minimum amount of materials and labor. Furthermore, the present invention provides a pocketed coil string construction which does not include outwardly-protruding seams. The manner in which the spring is situated within the fabric pockets allows a minimal amount of fabric to be used, and the manner in which the springs are inserted into the pockets insures effective placement of the springs within the pockets, without the requirement that the springs be "beaten" or otherwise turned after positioning within the pockets. The transverse weld lines are substantially parallel to the longitudinal axes of the springs, thus allowing the fabric to smoothly fit around the springs with a minimum of buckling or folding.

What is claimed is:

1. An encapsulated spring, comprising:
a spring having an axis of compression; and
a sheet of flexible material encapsulating said spring, said material having opposing edges and opposing first and second faces and being formed in a tubular configuration such that said edges are in a flat overlap configuration with a portion of said first face facing a portion of said second face, said tubular configuration having a longitudinal axis substantially orthogonal to said axis of compression of said spring, said tubular configuration of said material including first and second transverse seams positioned on opposing sides of said spring, each of said seams having an axis substantially parallel to said axis of compression of said spring.

2. The device as claimed in claim 1, wherein said spring is in a preloaded condition.

3. The device as claimed in claim 2, wherein said preloaded condition is such that said spring is compressed no more than one-third its unloaded height.

4. The device as claimed in claim 2, wherein said preloaded condition is such that said spring is compressed no more than one-half its unloaded height.

5. The device as claimed in claim 1, wherein said first and second transverse seams are substantially linear and coparallel to the longitudinal axis of said spring.

6. The device as claimed in claim 1, wherein said spring has a top, a bottom, and sides, and wherein said overlap configuration extends along one side of said spring.

7. An encapsulated spring, comprising:
a spring having an axis of compression; and
a sheet of elongate flexible material encapsulating said spring, said material having opposing edges and opposing first and second faces, and being formed in a tubular configuration such that a flat overlap seam runs along the length of said tubular configuration with a portion of said first face facing a portion of said second face, said tubular configuration having a longitudinal axis substantially orthogonal to said axis of compression of said spring, said tubular configuration of said material being provided with first and second transverse seams positioned on opposing sides of said spring, each of said seams having an axis substantially parallel to said axis of compression of said spring.

8. The device as claimed in claim 7, wherein said spring is in a preloaded condition.

9. The device as claimed in claim 8, wherein said preloaded condition is such that said spring is compressed no more than one-third its unloaded height.

10. The device as claimed in claim 8, wherein said preloaded condition is such that said spring is compressed no more than one-half its unloaded height.

11. The device as claimed in claim 7, wherein said first and second transverse seams are substantially linear and coparallel to the longitudinal axis of said spring.

12. The device as claimed in claim 7, wherein said spring has a top, a bottom, and sides, and wherein said seam is positioned along one side of said spring.

* * * * *